United States Patent [19]

Sager et al.

[11] Patent Number: 5,040,056
[45] Date of Patent: Aug. 13, 1991

[54] AUTOMATED SYSTEM FOR LOCATING AND TRANSFERRING OBJECTS ON A CONVEYOR BELT

[75] Inventors: James L. Sager, Boulder; Michael R. Schmehl, Aurora, both of Colo.

[73] Assignee: Technistar Corporation, Longmont, Colo.

[21] Appl. No.: 472,044

[22] Filed: Jan. 29, 1990

[51] Int. Cl.⁵ .............................................. H04N 7/18
[52] U.S. Cl. .................................... 358/101; 364/478; 901/8
[58] Field of Search ..................... 358/101, 106, 903; 382/8; 901/7, 8; 364/468, 478; 209/577, 739

[56] References Cited

U.S. PATENT DOCUMENTS

| | | | |
|---|---|---|---|
| 3,958,682 | 5/1976 | Martin | 198/19 |
| 4,033,448 | 7/1977 | McFarlane et al. | 198/465 |
| 4,084,684 | 4/1978 | Skinner II | 198/467 |
| 4,105,925 | 8/1978 | Rossel et al. | 250/561 |
| 4,527,326 | 7/1985 | Kohno et al. | 29/705 |
| 4,674,181 | 6/1987 | Hamada et al. | 29/703 |
| 4,770,121 | 9/1988 | Ebata et al. | 118/686 |
| 4,771,468 | 9/1988 | Batchelder et al. | 382/8 |
| 4,810,154 | 3/1989 | Klemmer et al. | 414/222 |
| 4,832,180 | 5/1989 | Ferrero | 198/468.8 |
| 4,851,902 | 7/1989 | Tezuka et al. | 382/8 X |
| 4,866,629 | 9/1989 | Chen et al. | 364/468 |
| 4,870,590 | 9/1989 | Kawata et al. | 901/7 X |
| 4,941,182 | 7/1990 | Patel | 382/8 X |

*Primary Examiner*—Victor R. Kostak
*Attorney, Agent, or Firm*—Beaton & Swanson

[57] ABSTRACT

An apparatus and method for picking up and manipulating randomly oriented and randomly positioned objects moving on a belt. An image processing unit using a vision system identifies and locates objects in successive overlapping vision windows up to a predetermined optimum number of objects. The locations of those objects is entered in an output queue which is transmitted to the object location queue of a first robot motion controller. The first robot picks up and deposits all the objects it can in the time available while the objects pass, and enters the locations of the objects not picked up in an output queue which is transmitted to the object location queue of a second robot motion controller. The robots can be arranged in a series of any number and the image processing units and vision systems can also be arranged in a series.

26 Claims, 7 Drawing Sheets

AUTOMATED SYSTEM FOR LOCATING AND TRANSFERRING OBJECTS ON A CONVEYOR BELT

BACKGROUND OF THE INVENTION

The use of robots in assembly and packaging is well known. In particular, robots have been used widely in automobile manufacturing and electronic components assembly. Robots can work all day, every day, without interruption, except for occasional maintenance and repair.

Known methods and apparatus for assembly and packaging using robots rely upon the substantial uniformity in size and shape among the objects to be assembled or packaged and their precise location. These known methods and apparatus are generally not effective with randomly positioned and randomly oriented objects. This is typically the case with objects that are deposited onto a conveyor belt, such as flat components that are asymmetrical about at least one axis. For these parts, the system must locate them on the moving conveyor belt and also determine their orientation. This requires a relatively sophisticated vision system. It also requires a method for choosing which of several objects on the belt should be picked up and in what order.

While the robotic manufacture and assembly of objects that are randomly positioned with random orientations on a conveyor belt presents particular difficulties, this is also an area where robots are especially needed. Performing the necessary operations by hand is likely to require short repetitive hand motions which can cause carpaltunnel syndrome and other long-term disabilities.

Included in this field is the packaging of food such as cookies, crackers and candies which are usually of a random orientation and a random position on a belt as they are dispensed from an oven or other manufacturing facility. Packaging food by robots is particularly attractive because it overcomes sensitive sanitation concerns related to hand packaging. The existing systems for robotic packaging of food, like most of the existing systems for other robotic applications, rely on an orderly presentation of the objects to be packaged. For example, the food packaging device disclosed in U.S. Pat. No. 4,832,180 requires that the objects to be packaged be substantially the same size, arranged in a row, and an equal distance from each other.

SUMMARY OF THE INVENTION

This invention provides a method and apparatus which uses a vision-equipped robotic system to locate, identify and determine the orientation of objects, and to pick them up and transfer them to a moving or stationary destination. A video camera periodically records images of objects located on a moving conveyor belt. The images are identified and their position and orientation is recorded in a moving conveyor belt coordinate system. The information is transmitted to a motion control device associated with a first robot. The motion control device coordinates the robot with the moving belt coordinate system and instructs the robot's arm to pick up certain objects that are favorably positioned in that robot's pre-determined pick-up window and to transfer those objects for deposition in the appropriate package or other destination. The conveyor belt conveys the objects that are still not picked up after passing through the first robot's pick-up window to a second robot, and the motion control device for the first robot transfers the position and orientation of those objects to the motion control device for the second robot.

The process is a continuous one which operates in real time. The video camera records images in discrete vision windows at a regular rate to cover all of the belt as it moves under the stationary camera. The information from each vision window is transferred to the first robot motion controller at the same rate that the images are recorded by the video camera, and then on to each subsequent motion controller at that same rate. Any number of robots with their associated motion control devices can be put in series under a given vision system, and any number of vision systems can be put in series.

DETAILED DESCRIPTION OF THE PREFERRED EMBODIMENT

Figure 1:
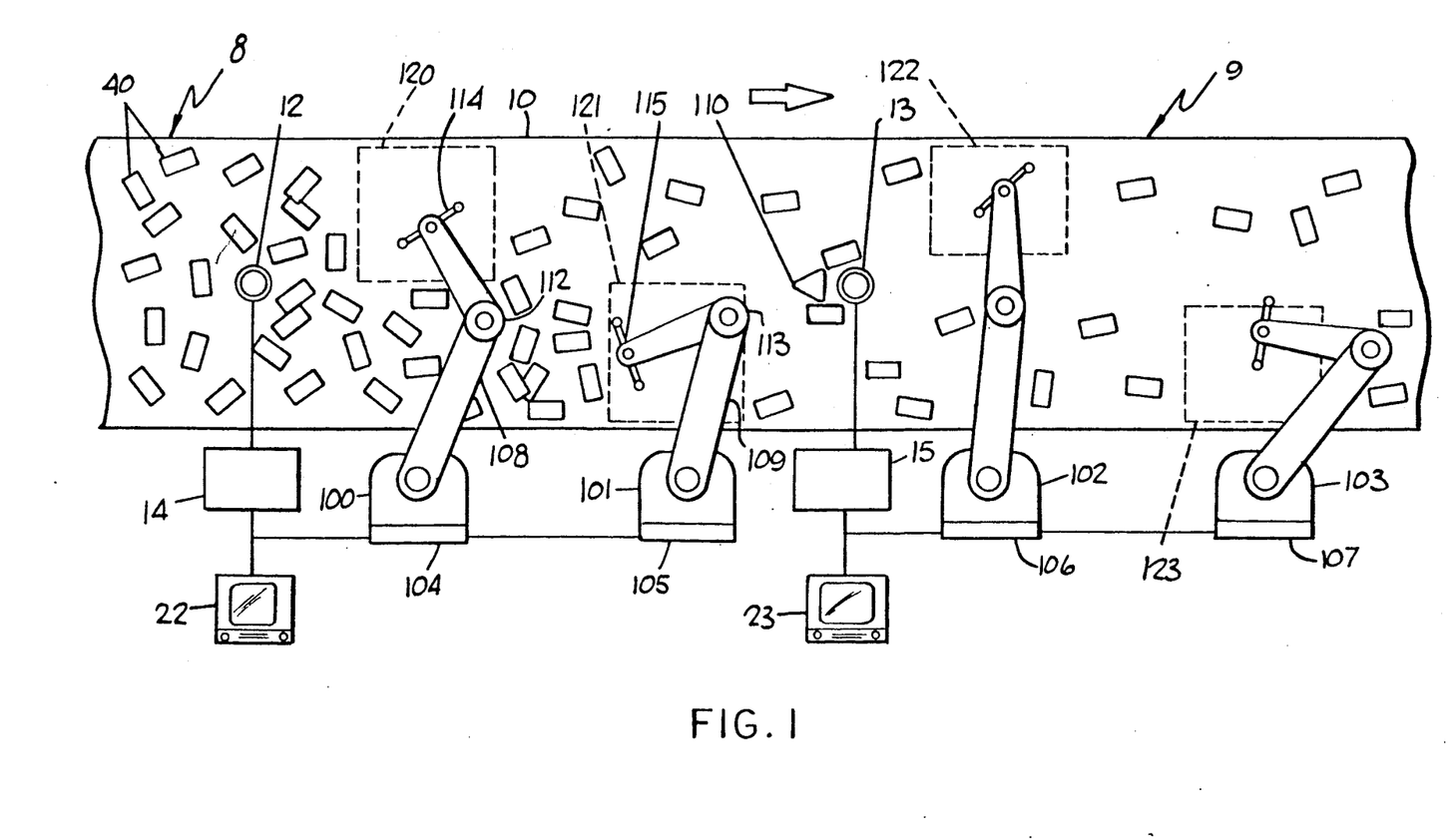
FIG. 1 shows a schematic top plan view of the conveyor belt, two vision systems in series and their robots of the present invention.

The overall apparatus is shown in FIG. 1. The basic elements of the apparatus 8 are a conveyor belt 10, a video camera 12, an image processing unit 14, and one or more robots 100 and 101. Each robot has an associated motion controller 104 and 105, a robot arm 108 and 109 with one or more pivot points 112 and 113, an end effector 114 and 115 holding one or more pick-up cups 116. The pick-up cups in the preferred embodiment are resilient inverted cup-shaped vacuum actuated members which move downward to contact the belt objects and lift them by a suction force. These basic hardware elements are well-known in the art. For example, the robot may be the Adept One Manipulator and the vision system may be Adeptvision, both by Adept Technology, Inc. The pick-up devices may also be gripping or slotted devices or any other device capable of moving the desired object.

A plurality of objects 40 to be assembled or packaged are located on the conveyor belt. In one application of the preferred embodiment the objects 40 are wafer-shaped cookies or crackers, although the invention can applied to a wide variety of food and non-food items. In all Figures the objects 40 are being conveyed from left to right, as indicated.

The video camera 12 remains stationary while the surface of the conveyor belt 10 moves under it. As the conveyor belt 10 moves underneath the video camera 12 a strobe light or other appropriate means (not shown) is activated at periodic belt intervals so that the video camera 12 photographs a series of static images of portions of the conveyor belt 10 and the objects 40 located on the conveyor belt 10. The portion of the conveyor belt 10 that is photographed by the video camera 12 is deemed a vision window, and the image photographed is deemed a vision window image 18. The strobe activates at fixed intervals in order to space the vision window images appropriately.

A friction wheel (not shown) is turned by the belt 10 to generate a belt encoder signal allowing a measurement of the belt travel. Each belt encoder signal is equivalent to a discrete distance of belt travel such as, for example, 1.0 millimeter. The strobe switch is calibrated to actuate at predetermined intervals of belt travel to space the vision window images as desired. By recording the belt encoder signal at the time the strobe is activated, and knowing the direction of belt travel and the number of belt encoder signals that elapse, the system can track the motion of the objects along the known vector in the direction of belt travel.

Figure 2:
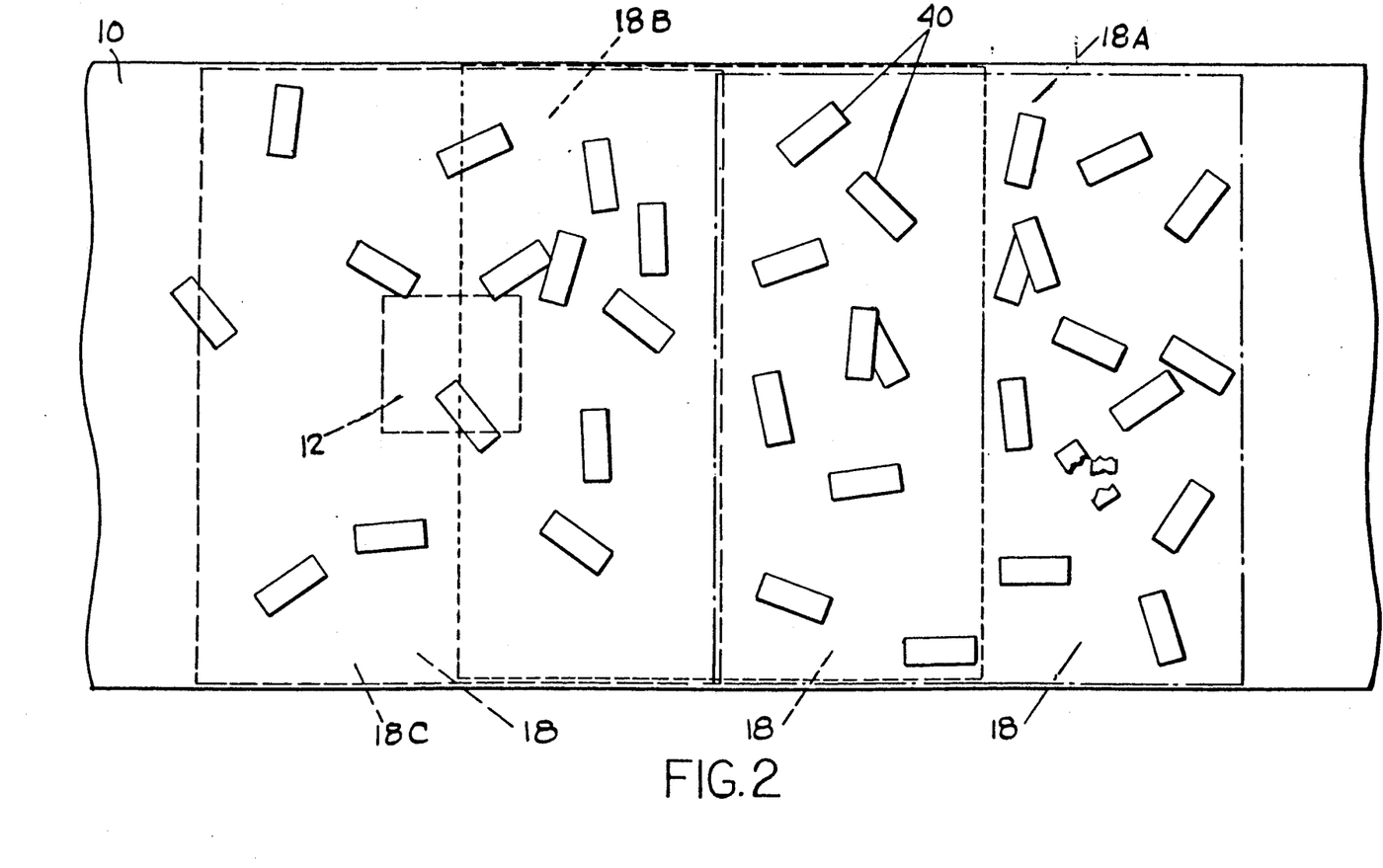
FIG. 2 shows a schematic top plan view of an example section of a conveyor belt with randomly located objects, showing three vision windows.

As shown in FIG. 2 a vision window 18 image is substantially the same width as the conveyor belt 10. In the preferred embodiment the vision window images 18 are substantially square, although the invention does not require a particular vision window image shape. FIG. 2 shows a conveyor belt 10, conveyed objects 40, and three consecutive vision window images 18A, 18B, 18C. The vision window images 18 overlap to avoid missing any objects that might bridge a boundary between successive vision window images. For example, in FIG. 2 the portion of the conveyor belt 10 and the objects 40 in the left half of vision window image 18A are also in the right half of vision window image 18B. In the example shown in FIG. 2, the overlap is 50%, but any overlap greater than the longest dimension of an object on the belt will suffice.

An automatic digital processor converts the analog video signals in each static vision window image into digital data. This process is well known. For example, the conversion can begin by assigning each pixel in the image an address (i,j), where i represents the pixel's location along the axis parallel to the belt 10 and j represents the pixel's location along the axis perpendicular to the belt 10. Each pixel (i,j) is then assigned a gray scale value from, for example, 1 to 128 in proportion to the darkness of the pixel. The digitized image is then stored in computer memory as an array.

The digitized image is further processed to remove all gray scale values to produce a binary image. All array locations with gray scale values greater than a threshold value are assigned the value 1 and all array locations with gray scale values less than or equal to the threshold value are assigned the value 0. The actual threshold value will vary depending on the lighting, particular applications of conveyor belts, objects and video cameras. The resulting digital image is stored in computer memory as an array of 1s and 0s.

Figure 3:
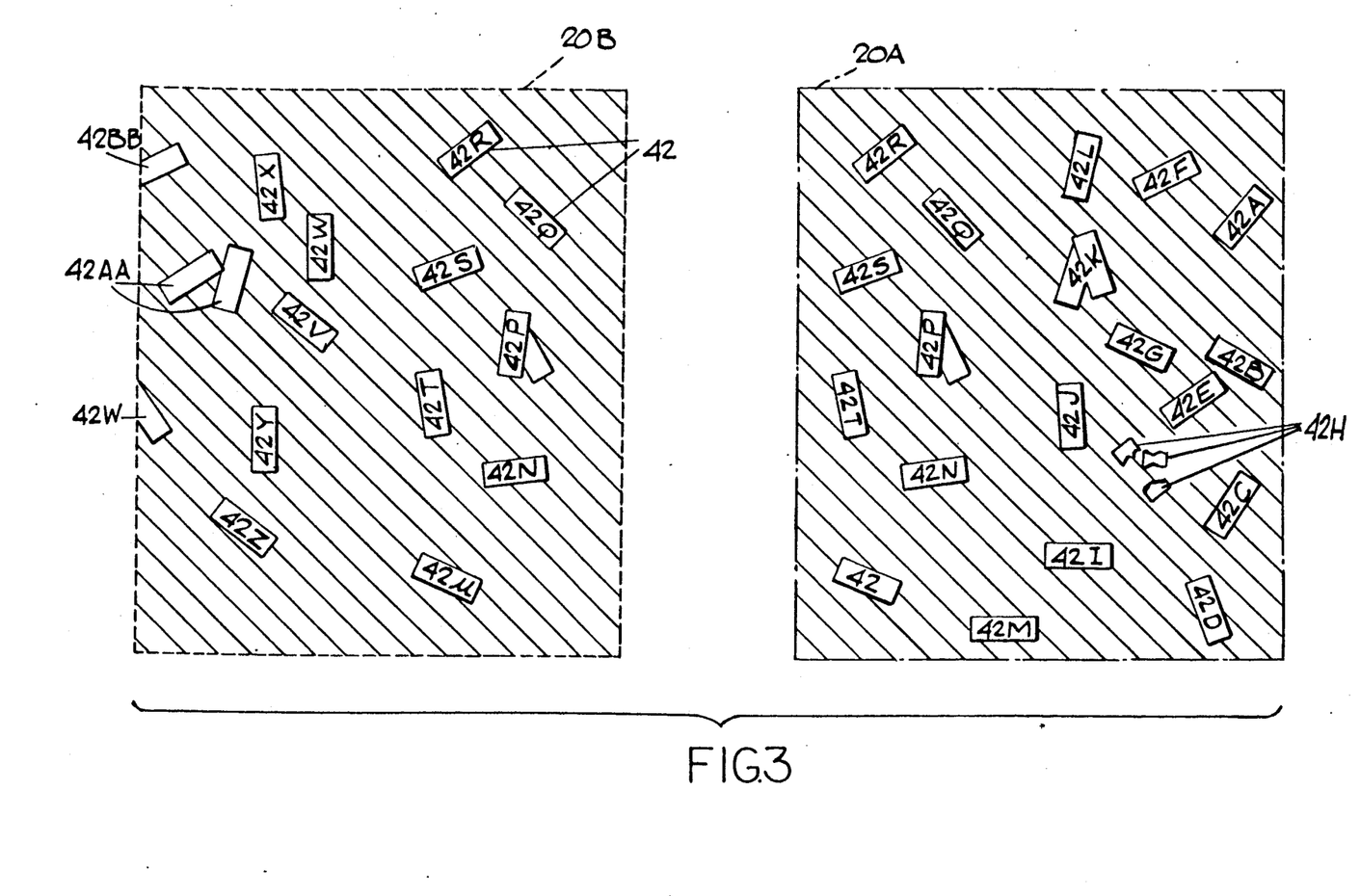
FIG. 3 shows in detail two windows shown in FIG. 2.

FIG. 3 represents the analog equivalents 20A and 20B of the digitally processed images corresponding to windows 18A and 18B, respectively. The cross-hatched areas are the analog equivalents of image array locations whose values are 1 and the white areas are the analog equivalents of image array locations whose values are 0. The object images 42 correspond to the objects 40 in FIG. 2. FIG. 3 may actually be shown on a video monitor 22 used with the system as shown in FIG. 1.

Figure 4A:
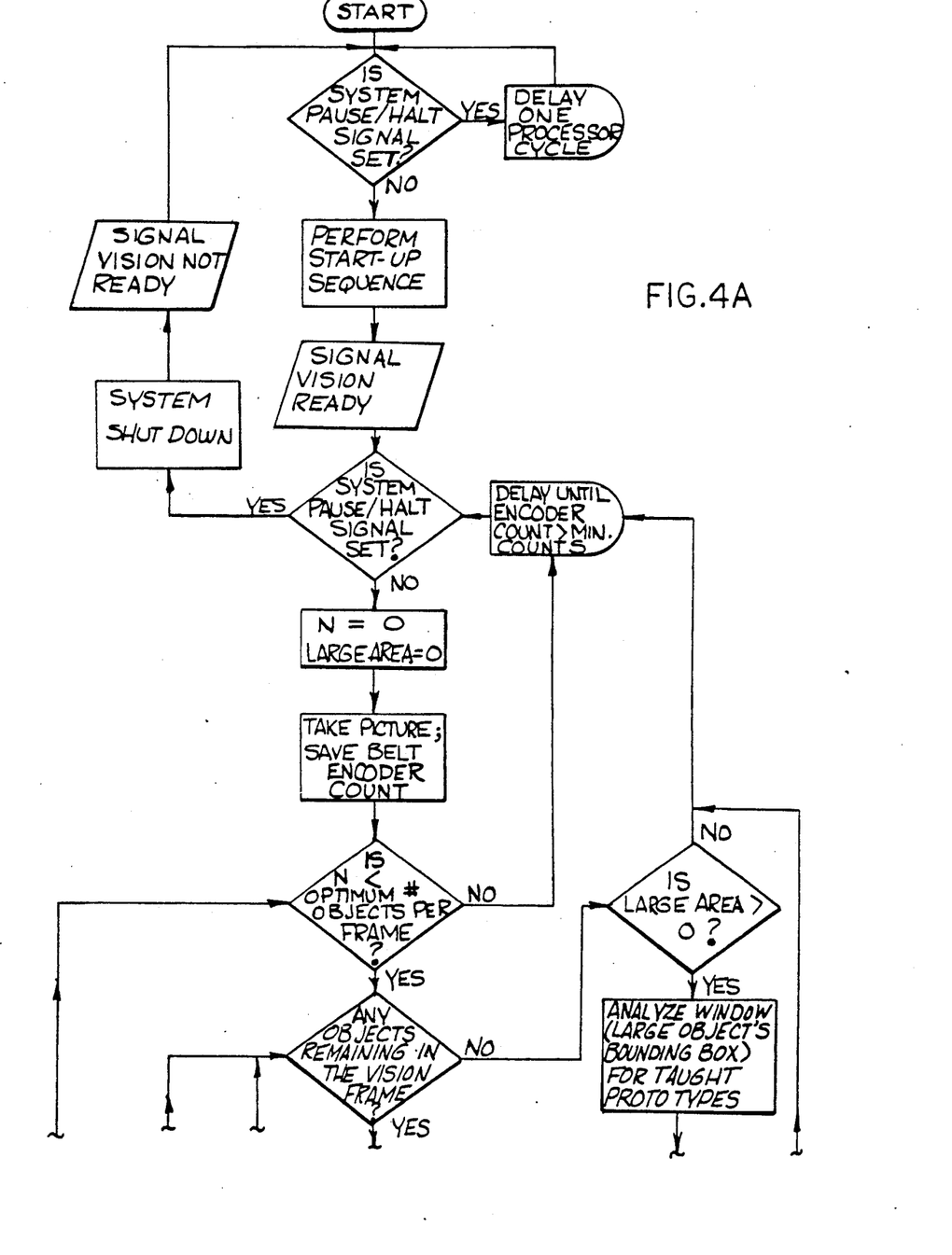
FIGS. 4a and 4b shows flow chart of the vision system object identification and location process.
Figure 4B:
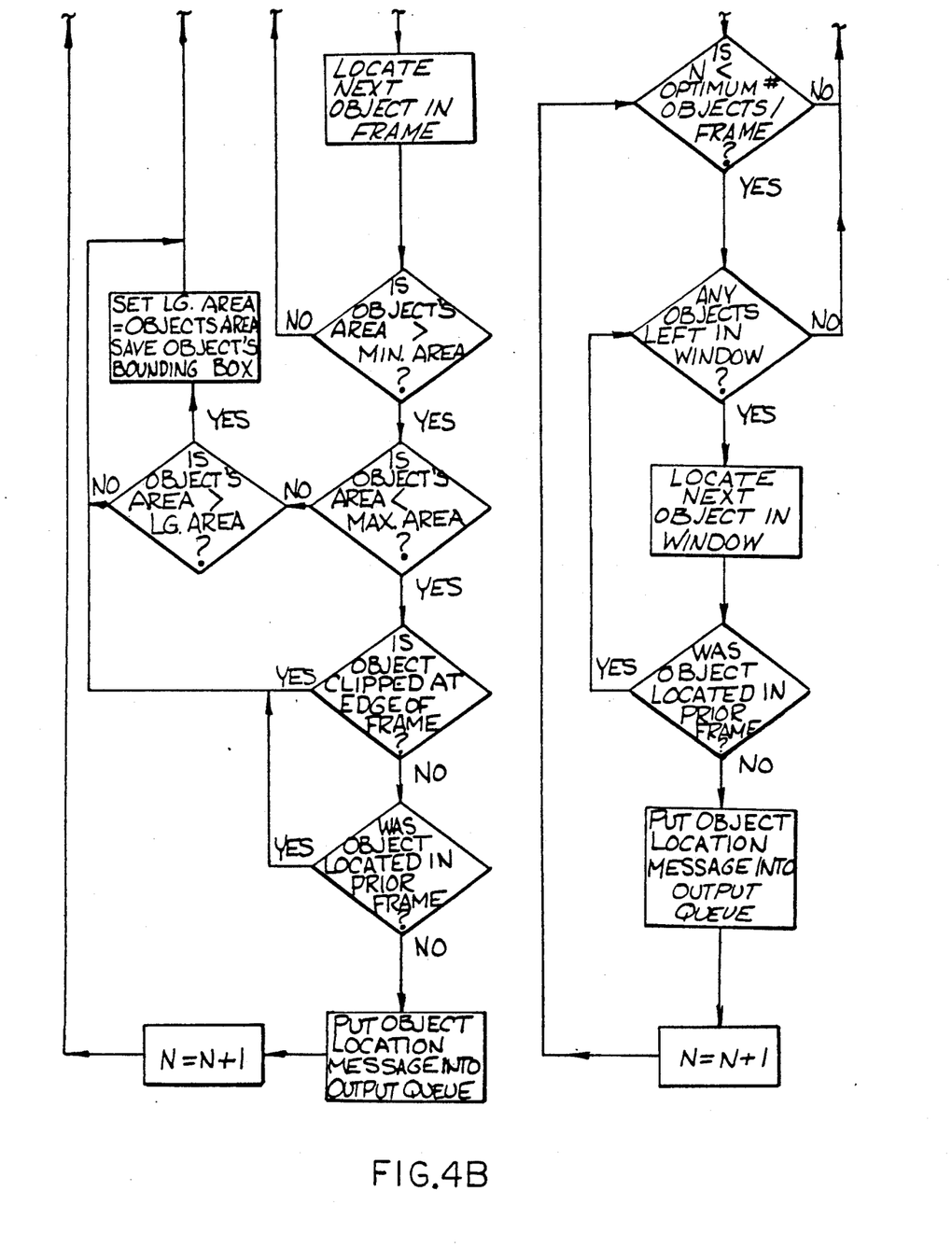

The image 20 is then analyzed by the image processing unit 14. FIG. 4 shows a flow chart of this process, and it proceeds as follows. The image processing unit initially checks whether a system pause/halt signal is set which allows temporary interruption of the image processing operation. If the pause/halt signal is not set, then a start-up sequence is performed to establish a coordinate system, to translate the coordinate system into the belt encoder signals which indicate belt movement, to choose an operative object image from several which may be stored in the image processing unit, to choose an OPTIMUM NUMBER of object images for recognition in each vision window image based on object type, belt speed and other variables, and to create appropriate graphics or print-out parameters. The start-up sequence also calibrates the coordinate axis of the digitized image array that is parallel with the belt movement and robots using the belt encoder signal. The details of all these initial start-up sequence operations would be apparent to one skilled in the art.

Figure 5A:
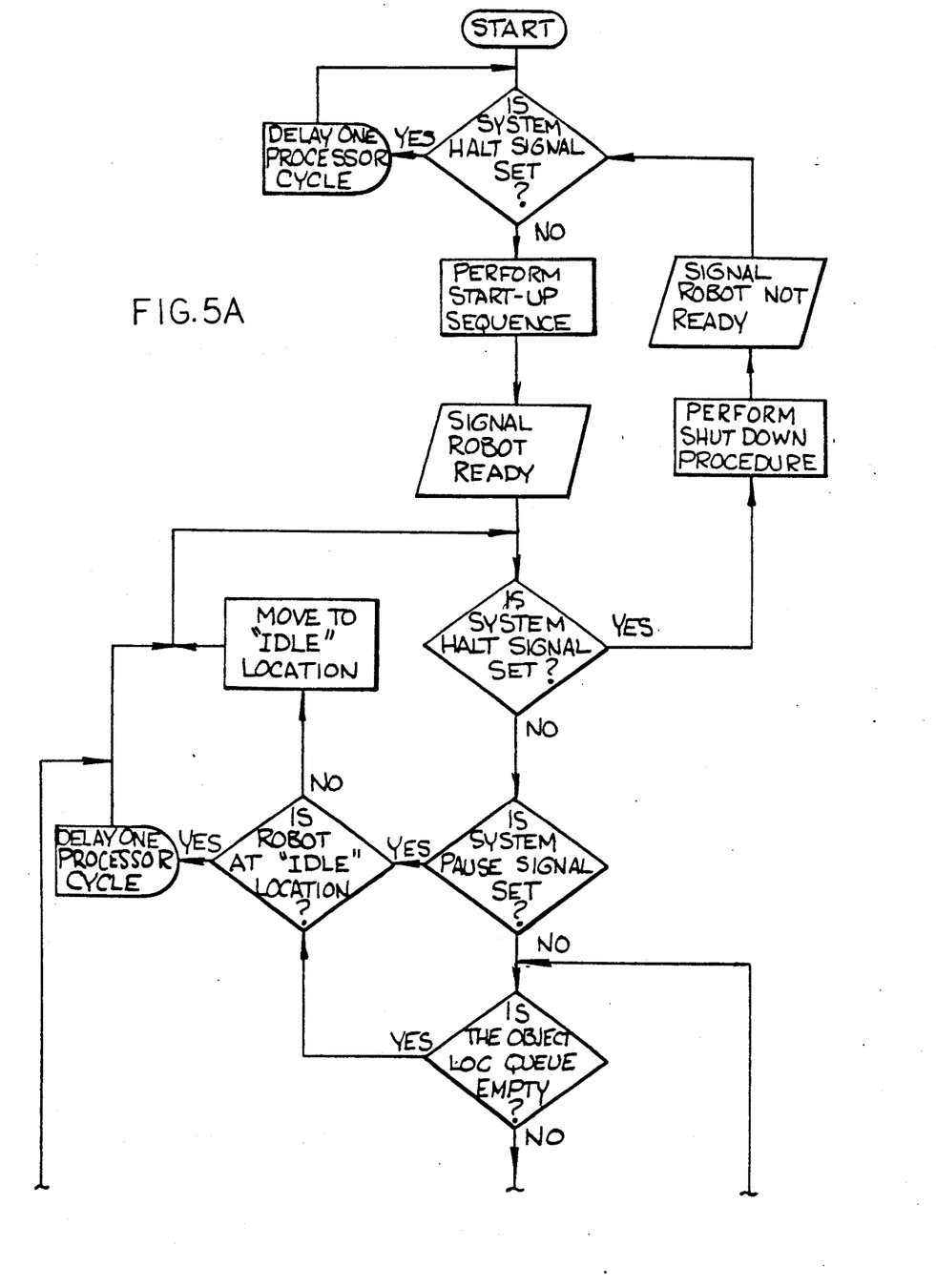
FIGS. 5a and 5b show a flow chart of the robot system motion control process.
Figure 5B:
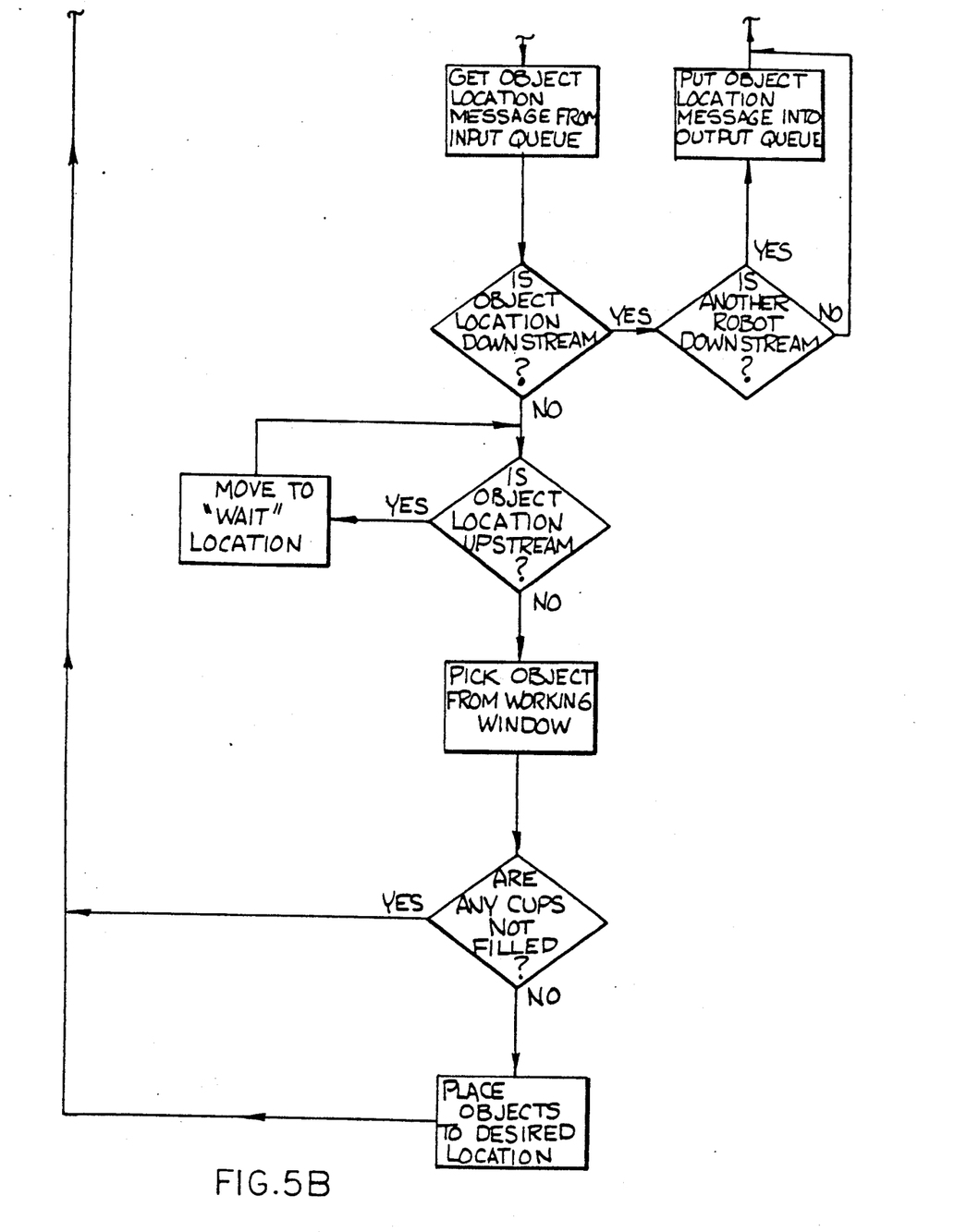

After the start-up sequence is performed, an image processing unit ready signal is generated. This signal is interrogated by the first robot motion controller to allow the motion controller to proceed, as described in connection with FIG. 5 below. After that, the image processing unit again checks whether the pause/halt signal has been set. If so, then the image processing unit performs a shut-down procedure which records the operations up to that point and generates a new image processing unit ready signal.

If the pause/halt signal is not set on the last check described above, then the image processing unit proceeds with processing the image. This starts by assigning the value "0" to "n," which represents the number of images recognized in the vision window image. It also assigns the value "0" to LARGE AREA which has the purpose described below.

The strobe light associated with the video camera 12 flashes and the belt encoder count is recorded. Then the system inquires whether n is less than the OPTIMUM NUMBER of objects in a vision window. The OPTIMUM NUMBER is the predetermined number of objects which the robots that are assigned to that particular vision system are capable of picking up, plus or minus a tolerance, given the speed of the belt, the density and type of the objects, and the robot and packaging parameters. The OPTIMUM NUMBER varies depending on all those factors, and is assigned in the start-up sequence.

If n is not less than the OPTIMUM NUMBER, then the image processing unit stops analyzing images, and delays further operation until the belt moves into position for the next vision window. This is done by allowing the image processing unit to delay an encoder count equal to the predetermined distance between the leading edge of successive vision window images. In the example of FIG. 2, this distance is one-half the vision window image length so that the vision window images overlap by 50%.

If n is less than the OPTIMUM NUMBER, then the image processing unit inquires whether there are any object images in the window. If so, then the next object image is located proceeding from right to left. The image processing unit determines whether that object image falls within the MAXIMUM AREA and MINIMUM AREA sizes established in the start-up sequence. If the object image is too small, it is ignored as a fragment or broken object that should not be used. Those objects travel the length of the belt and drop off the end into a receptacle. If the object image is too large, then the image processing unit determines whether the object's area is greater than LARGE AREA. If so, then LARGE AREA is set equal to the object's area and the object's boundaries are recorded for later prototype recognition. The image processing unit then returns to the decision box which inquires whether there are any objects remaining in the vision window image.

If the object is neither smaller than MINIMUM AREA nor larger than MAXIMUM AREA, then the image processing unit goes on to check whether any part of it is so close to the vision window image boundary that its edges may be confused with those boundaries or the boundaries will distort the object configuration. This is done by establishing a margin around the vision window image. In the preferred embodiment, the margin is 2%. For example, if the vision window image is 1000 by 1000 millimeters, the margins will be 20 millimeters wide. If any portion of the object is in that margin, then the image processing unit ignores that object. If not, then the image processing unit checks whether the location of that object corresponds within a predetermined tolerance to an object image location that was identified and recorded in a previous vision window image, since each vision window image overlaps the preceding and subsequent vision window image by 50%. If the object was identified in a previous vision window image, then it is ignored because it is already recorded.

If the object was not identified in a previous vision window image, then its location is recorded in the output queue. That constitutes the recording of one image, so n is then made equal to n+1. The image processing unit then returns to the query whether n is less than OPTIMUM NUMBER. As explained above, as soon as n is not less then the OPTIMUM NUMBER, the image processing unit is done analyzing that vision window image, and it delays until the belt moves into position to photograph the next vision window image.

If the number of analyzed images is still less than the OPTIMUM NUMBER, the image processing unit goes on to the next image, still moving from right to left in the direction of belt travel. It repeats this process until n reaches the OPTIMUM NUMBER or there are no images remaining in the vision window image. If there are no images remaining in the vision window image and n is still less than the OPTIMUM NUMBER, then the image processing unit proceeds to the prototype recognition process depicted on the right hand side of the flow chart of FIG. 4.

The first step of the prototype recognition process is to inquire whether LARGE AREA is greater than 0, meaning that at least one image object was identified with an area greater than the MAXIMUM AREA parameter set by the start-up sequence. If not, then there are no more objects to be picked up in that vision window image, and the image processing unit returns to delay mode until the belt moves sufficiently to photograph a new vision window image. If LARGE AREA is greater than 0, then there is at least one large object image to be analyzed in the vision window image. That analysis is accomplished by comparing the size and configuration of the large object image with a prototype image of the object which the system is then programmed to pick up. If any portion of the large object image corresponds to the prototype, within pre-set tolerances, then that portion of the large object image is deemed an object and is treated accordingly. Generally, the large object images are of touching objects. In that case, the large object image is segregated into two or more images corresponding to the two or more touching objects.

If n is still less than the OPTIMUM NUMBER, then the image processing unit locates the first large object image proceeding from right to left. If the large object image was located in a previous window, it is disregarded to avoid duplicate entries. If the large object image was not located in a previous vision window, then the location of each individual object image it represents is entered in the output queue. Then n is set equal to n+1 and the image processing unit returns to the inquiry whether n is less than the OPTIMUM NUMBER.

FIG. 5 shows the process followed by each robot according to its individual motion controller. Like the image processing unit, the motion controller initially checks whether a halt signal is set. If so, the motion controller delays a processor cycle and then rechecks until the halt signal is no longer set. A start-up sequence is then performed which is analogous to the start-up sequence for the image processing unit to calibrate the motion controller, set appropriate parameters corresponding to those set in the image processing unit and interrogate the image processing unit whether an image processing unit ready signal is present. Following the performance of the start-up sequence, a robot ready signal is generated indicating that the motion controller and robot are ready for operation. The motion controller then rechecks whether a system halt signal is set. If so, then a shut-down procedure is implemented to archive the results of operation and a robot not-ready signal is generated to prevent operation until the start-up sequence is re-performed. If the motion controller halt signal is not set, the system checks whether a system pause signal is set. If so, the motion controller moves the robot arm to idle location if it is not already there and waits until the halt and pause signals are no longer set.

When the halt and pause signals are not set, the motion controller checks whether the object location queue is empty. The object location queue is the output queue from the image processing unit in the case of the first robot adjacent the vision system in the direction of belt movement. In the case of the other robots, the object location queue is the output queue of the robot adjacent that robot in the opposite direction from the direction of belt movement and is transmitted using ordinary data transmission means such as cabling. Thus, the object locations "cascade" from one robot to another "downstream" in the direction of belt travel. The locations of objects that are not picked up by each robot are transmitted to the next robot, and so on.

If the object location queue is empty, then the robot arm is moved to the idle position if it is not already there, and the motion controller delays a processor cycle before it again checks the object location queue, assuming the halt or pause signals are not set.

If the object location queue is not empty, then the motion controller receives the next object location in the queue. It first checks whether the location of that object is too far in the direction of belt travel for the robot to reach it—that is, whether it has moved past a predetermined pick-up window for that robot. If so, and there is another robot in the direction of belt travel covered by the same vision system, then the object location is entered in the output queue. That output queue is the object location queue for the next robot. If the object is not too far in the direction of belt travel for the robot to reach it, the motion controller checks whether it is too far in the direction opposite the direction of belt travel for the robot to reach it—that is, whether it has not yet moved into the robot pick-up window. If so, then the motion controller waits until the object moves into the pick-up window.

In determining whether an object has moved past the pick-up window or has not yet moved into the pick-up window, the motion controller considers the time it would take the robot arm to move from its current position to the location of the object and the distance the object would travel on the belt during that time. In other words, an object that is in the pick-up window when the robot is prepared to pick it up, may move out of the pick-up window by the time the robot can reach it. The motion controller considers that movement and will not attempt to pick it up. Similarly, an object that is not yet in the pick-up window when the robot is prepared to pick it up may move into the pick-up window by the time the robot can reach it. The motion controller will go ahead and direct the robot to pick-up that object after accounting for its movement during the time it takes for the robot to reach it.

The robot pick-up window is not necessarily the same size as a vision window. The robot pick-up window is the preferred area on the belt which can be efficiently reached by the robot arm. This preferred area may be something less than all the area the robot arm is capable of reaching, so that the robot avoids inefficient long motions between pick-ups. This is particularly true if the robot end effector has a plurality of pick-up cups that allow multiple pick-ups before returning to the destination site. In that case, the system will work most efficiently if all the pick-up cups are filled from a small pick-up window and then the robot arm moves to the destination site. Of course, the pick-up windows must be established for each robot with consideration of the pick-up windows for the other robots operating under that vision system. For example, if one robot pick-up window covers the far side of the belt, then another robot pick-up window should cover the near side of the belt. This is the case in FIG. 1 where robot 100 covers pick-up window 120 and robot 101 covers pick-up window 121. It may also be desireable to increase the size of the pick-up windows toward the end of the belt as the density of objects on the belt decreases, to minimize the idle time of the robots toward that end. If a robot pick-up window does not extend the complete width of the belt, then of course the motion controller must check whether each object in the object location input queue falls within the narrower pick-up window boundary as well as whether the object is too far upstream or downstream.

If a plurality of cups are on the robot end effector, each cup is filled before the robot arm moves to the destination point. After each end effector cup is filled with an object, the motion controller returns to the last system halt signal query to repeat the pick-up routine for another cup until all cups are filled.

The motion controller then directs the robot arm to deposit the objects in the end effector cups at the appropriate destination site. That destination site may be a stationary position or a moving position such as another belt. Either position ma be adjusted in quantum steps such as a single cracker wafer width to account for stacking of objects in a package. The motion controller considers the object orientation in picking up the object and depositing it. For example, wafer-shaped crackers stacked in a tray must be picked up and placed a certain way. This orientation process is well-known in the art.

A hypothetical example of the image recognition process is useful. The example will use images 20A and 20B in FIG. 3 which are the analog equivalent to vision window images 18A and 18B, respectively, from FIG. 2. The OPTIMUM NUMBER is given to be 15. As a convention, the routine will sweep across the vision window image 20A beginning at a leading edge corner and extending in a direction perpendicular to the belt travel so that each point is analyzed once. The image is reduced to a binary image in the manner previously explained. Object images 42A, 42B, 42C, 42D, 42E, 42F, 42G, 42I, 42K, 42L, 42N, 42Q, 42R, 42S, in that order, are identified as object images and their locations are entered in the vision window image processing unit output queue. Object image 42H (a broken cookie) and object image 42P (two cookies which overlap) are not identified as ideal object images. Object image 42M is too close to the edge of the image 20 to be identified. No prototype identification is attempted because 15 ideal object images, equal to the vision window image OPTIMUM NUMBER, have been identified. The locations of those objects are entered in the output queue and are transmitted to the first motion controller using ordinary data transmission means such as cabling. Because this is the first vision window image analyzed in this vision system, there are no duplicates from preceding vision window images.

The routine proceeds to the next vision window image, identified as vision window image 20B. The object images 42 in image 20B whose locations match the locations of previously identified object images 42N, 42Q, 42R, 42S in image 20A are duplicates of ones identified in the previous vision window image and their locations are not transmitted to the image processing unit output queue. Object images 42T, 42U, 42V, 42W, 42X, 42Y, 42Z are identified as object images. Object images 42BB and 42CC are too close to the vision window image boundary to be identified. Only 7 object images have been identified at this point, and so large object images are now identified by comparing them to the prototype image. The object image 42 in image 20B that corresponds to object image 42P (overlapped objects) in image 20A is again not identified. Overlapping objects are generally not identified because the system operates in only two dimensions, so it cannot determine which object is on top and should be picked up first. Object image 42AA (touching objects) is identified as two object images. No more object images 42 remain in image 20B. Thus a total of 7 object images and 2 additional prototype object images are identified and entered into the image processing unit output queue to be transmitted to the first robot motion controller input queue.

The system can be operated in series as shown in FIG. 1. A first vision system 8 together with its video camera 12, monitor 22, image processing unit 14 and associated robots 100 and 101 and their respective motion controllers 104 and 105, serve to pick-up as many objects as they can. Then, a second vision system 9 together with its video camera 13, monitor 23, image processing unit 15 and associated robots 102 and 103 and their respective motion controllers 106 and 107, pick up as many of the remaining objects as they can. The number of systems in series is limited only by the capacity of the belt.

The system may be aided with the use of channelling means, such as wedge-shaped devices 110, suspended just above the surface of the conveyor belt to channel the objects 40 and increase their density on the belt 10 in order to minimize robot arm travel. Such channelling means are likely to be most useful toward the end of the belt where the object densities are relatively low. The channeling means are positioned immediately before a vision system so that the object positions are not changed after being established by the vision system.

It will be apparent that the system can also be configured with robots on both sides of the belt in order to increase the means for picking up objects. The robots on each side of the belt may have their own vision system located on that half of the belt or may share a single vision system which covers the belt from side to side.

What is claimed is:

1. A method for picking up objects from a moving conveyor belt and transferring them to a destination, comprising:

receiving a pixel image of a first vision window image portion of said belt containing images of said objects using first image-receiving means;

digitizing said first vision window image by assigning a gray scale level and a coordinate location to the pixels in said first vision window image;

electronically determining and transmitting, utilizing first data transmission means, the locations of at least one of said objects represented by object images in said first vision window image to a first motion controller directing a first robot means associated with said first image-receiving means located in the direction of belt travel with respect to said first image-receiving means;

picking up at least one of said objects represented by object images in said first vision window image, the locations of which were transmitted to said first motion controller, using said first robot means;

transmitting, utilizing second data transmission means, the locations of at least one of the objects represented by object images in said first vision window image which were not picked up by said first robot means, from said first motion controller to a second motion controller directing a second robot means associated with said first image-receiving means located in the direction of belt travel with respect to said first robot means; and picking up at least one of said objects represented by object images in said first vision window image, the locations of which were transmitted to said second motion controller, using said second robot means.

2. The method of claim 1, further comprising:

establishing a binary image of said digitized image by assigning 0 or 1 to each pixel gray scale value depending on whether said gray scale value is above or below a predetermined threshold value; and determining the location and configuration of said objects represented by images in said first window image using said binary image.

3. The method of claim 1, further comprising establishing a pick-up window area on said belt for each said robot means associated with said first vision window, and wherein each motion controller which directs each robot means associated with said first image-receiving means repeatedly directs said robot means to pick up certain of the objects in said robot means' pick-up window.

4. The method of claim 3, wherein each object that each motion controller directs each robot means to pick up is the object in said robot means' pick-up window that is farthest in the direction of belt travel.

5. The method of claim 1, wherein the locations of objects that are smaller than a predetermined minimum area are not transmitted to said first motion controller.

6. The method of claim 1, wherein the locations of objects that are larger than a predetermined maximum area are not transmitted to said first motion controller determined by comparing said larger object images to a prototype image, and the locations of objects represented by those larger object images that do not match any of the prototype image are not transmitted to said first motion controller.

7. The method of claim 6, wherein object images larger than a predetermined maximum area are compared to a prototype image, and those portions of said larger images that match said prototype image within preset tolerances are deemed to be images of individual objects and their locations are transmitted to said first motion controller.

8. The method of claim 7, further comprising establishing a vision window image boundary at the edge of said vision window image, and wherein the objects that are at least partially in said vision window image boundary are not picked up.

9. The method of claim 1, wherein the locations of objects in excess of a predetermined optimum number are not transmitted to said first motion controller.

10. The method of claim 9, wherein said objects are located and counted in the order of their distance from one edge of said vision window image.

11. The method of claim 9, wherein said optimum number is equal to the number of objects that the robots associated with said first image-receiving means can pick up considering variables including the speed of the belt and the character of the object.

12. The method of claim 1, further comprising:

receiving a pixel image of a subsequent vision window portion of said belt containing images of said objects using said first image-receiving means, said subsequent vision window having an edge in the direction of belt travel that is a predetermined distance in the direction opposite belt travel from the edge in the direction of belt travel of the adjacent vision window in the direction of belt travel;

digitizing said subsequent vision window image by assigning a gray scale value and a coordinate location to the pixels in said subsequent vision window image;

electronically determining and transmitting, utilizing said first data transmission means, the locations of at least one of said objects represented by object images in said subsequent vision window to said first motion controller directing said first robot means;

picking up at least one of said objects represented by object images in said subsequent vision window image, the locations of which were transmitted to said first motion controller, using said first robot means;

transmitting, utilizing said second data transmission means, the locations of at least one of the objects represented by object images in said subsequent vision window image which were not picked up by said first robot means, from said first motion controller to said second motion controller;

picking up at least one of said objects represented by object images in said subsequent vision window image, the locations of which were transmitted to said second motion controller, using said second robot means.

13. The method of claim 12, wherein each vision window overlaps each adjacent vision window, and wherein the location of objects whose locations were in the adjacent vision window in the direction of belt travel and were previously transmitted to said first motion controller are not transmitted again to said first motion controller.

14. The method of claim 13, wherein the total area on the conveyor belt from which each robot means is capable of picking up objects includes a smaller area from which the robot means can pick up a plurality of objects faster than the robot means can pick up the same number of a plurality of objects from the total area and wherein the robot means picks up objects from only the smaller area.

15. The method of claim 14, wherein said smaller area is larger for robot means away from the said image-receiving means with which they are associated than for robot means close to said image-receiving means with which they are associated.

16. The method of claim 3, wherein said robot means includes a plurality of pick-up cups, and each cup is filled with an object before all the objects in the cups are moved to the destination.

17. The method of claim 13, further comprising:
receiving a pixel image of another first vision window portion of said belt using second image-receiving means in the direction of belt travel from the last robot means in the direction of belt travel associated with said first image-receiving means;
digitizing said another first vision window image by assigning a gray scale value level and coordinate location to pixels is said another first vision window image;
electronically determining and transmitting, utilizing third data transmission means, the locations of at least one of said objects to another first motion controller directing another first robot means located in the direction of belt travel with respect to said second image-receiving means;
picking up at least one of said objects represented by object images in said another first vision window image, the locations of which were transmitted to said another first motion controller, using said another first robot means;
transmitting, utilizing fourth data transmission means, the locations of at least one of the objects represented by object images in said another first vision window image which were not picked up by said another first robot means, from said another first motion controller to another second motion controller directing another second robot means associated with said second image-receiving means located in the direction of belt travel with respect to said another first robot means; and
picking up at least one of said objects represented by object images in said another first vision window image, the locations of which were transmitted to said another second motion controller, using another second robot means.

18. A method for picking up objects from a moving conveyor belt and moving them to a destination, comprising:
receiving a series of overlapping images of vision window portions of said belt using image-receiving means, said windows being fixed on the belt and moving therewith;
digitizing each of the vision window images in said series, said digitizing including assigning a coordinate location to pixels in said image;
electronically determining and transmitting, utilizing first data transmission means, the locations of at least some of said objects to a first motion controller directing a first robot means, said determining and transmitting being done a vision window image at a time for each vision window image in said series;
picking up at least one of said objects using said first robot means at the time it moves within the reach of said first robot means;
transmitting, utilizing second data transmission means, the locations of at least one of the objects which were not picked up by said first robot means from said first motion controller to a second motion controller directing a second robot means located in the direction of belt travel with respect to said first robot means; and
picking up at least one of said objects using said second robot means at the time the object moves within the reach of said second robot means.

19. A system for picking up and transferring objects located on a moving conveyor belt, comprising:
image-receiving means to receive pixel images of a series of vision window portions of said belt;
image processing means electronically connected with said image receiving means for assigning a location to objects represented in said images;
a plurality of robot means in series adjacent to said belt, each with a directing motion controller, wherein the motion controller directing the first robot means receives the locations of objects from said image processing means and the motion controller directing each subsequent robot means receives the locations of objects not picked up by any preceding robot means from the motion controller directing the immediately preceding robot means; and
means associated with each motion controller for directing each robot which the motion controller directs, to pick up at least some of the objects not picked up by any preceding robot.

20. The system of claim 19, wherein said image processing means determines and transmits to the first motion controller the locations of no more than a predetermined number of objects in each vision window in said series, said number being based on variables including the belt speed and number of robot means in said robot means series.

21. The system of claim 20, wherein said vision windows overlap in the direction of belt travel by a predetermined distance.

22. The system of claim 21 wherein the locations of objects in each vision window is determined and transmitted to the first motion controller a vision window at a time, and the locations of objects transmitted to the first motion controller for one vision window are not transmitted to the first motion controller for an adjacent overlapping vision window.

23. The system of claim 22, wherein the objects that can be reached by each robot means are picked up by said robot means in the order of the direction of belt movement.

24. The system of claim 23, wherein the image processing means does not transmit to the first motion controller the locations of objects smaller than a predetermined minimum area.

25. The system of claim 24, wherein the image processing means compares the shape and size of images that are larger than a predetermined maximum area with a prototype image and assigns separate object locations to each object represented by said larger images if any portion of the larger image matches the prototype image within a predetermined tolerance.

26. The system of claim 24, wherein each of said robot means includes a plurality of end effector cups for picking up objects.

* * * * *